(12) United States Patent
Yim et al.

(10) Patent No.: US 11,604,820 B2
(45) Date of Patent: Mar. 14, 2023

(54) METHOD FOR PROVIDING INFORMATION RELATED TO GOODS ON BASIS OF PRIORITY AND ELECTRONIC DEVICE THEREFOR

(71) Applicant: Samsung Electronics Co., Ltd., Gyeonggi-do (KR)

(72) Inventors: Jonghwa Yim, Gyeonggi-do (KR); Daekyu Shin, Gyeonggi-do (KR); Sungho Lee, Gyeonggi-do (KR); Jungeun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 17/266,168

(22) PCT Filed: Aug. 2, 2019

(86) PCT No.: PCT/KR2019/009655
§ 371 (c)(1),
(2) Date: Feb. 5, 2021

(87) PCT Pub. No.: WO2020/032487
PCT Pub. Date: Feb. 13, 2020

(65) Prior Publication Data
US 2021/0303614 A1   Sep. 30, 2021

(30) Foreign Application Priority Data

Aug. 8, 2018 (KR) .................. 10-2018-0092580

(51) Int. Cl.
*G06F 16/532* (2019.01)
*G06F 16/538* (2019.01)
(Continued)

(52) U.S. Cl.
CPC .......... *G06F 16/532* (2019.01); *G06F 16/535* (2019.01); *G06F 16/538* (2019.01); *G06F 16/5846* (2019.01)

(58) Field of Classification Search
CPC .... G06F 16/532; G06F 16/535; G06F 16/538; G06F 16/5846
See application file for complete search history.

(56) References Cited

U.S. PATENT DOCUMENTS

| | | | |
|---|---|---|---|
| 2007/0133947 | A1 | 6/2007 | Armitage et al. |
| 2011/0063468 | A1 | 3/2011 | Ahn et al. |
| 2012/0265761 | A1 | 10/2012 | Atsmon et al. |
| 2014/0064559 | A1 | 3/2014 | Sugasawa et al. |

(Continued)

FOREIGN PATENT DOCUMENTS

| | | |
|---|---|---|
| JP | 5277941 | 8/2013 |
| JP | 2014-49015 A | 3/2014 |

(Continued)

OTHER PUBLICATIONS

Korean Office Action dated Nov. 3, 2022.

*Primary Examiner* — Angelica Ruiz
(74) *Attorney, Agent, or Firm* — Cha & Reiter, LLC

(57) ABSTRACT

The disclosure is for displaying a search result for products. A server may include a communication module, a memory including a database which stores product information in association with one or more product images corresponding to a product and text information related to the product, and a processor. The processor may receive a query image for an external object from an electronic device by using the communication module, select, from the database, a plurality of pieces of product information corresponding to the external object, based on similarities between the one or more product images and the query image, extract the text information for the external object included in the query (Continued)

image, determine a priority among the plurality of pieces of product information, based on a comparison between the extracted text information and the text information included in the selected plurality of pieces of product information, and transmit, to the electronic device, at least some of the plurality of pieces of product information and information on the priority, in response to the reception, by using the communication module.

11 Claims, 18 Drawing Sheets

(51) Int. Cl.
*G06F 16/535* (2019.01)
*G06F 16/583* (2019.01)

(56) References Cited

U.S. PATENT DOCUMENTS

| | | | |
|---|---|---|---|
| 2014/0198998 A1* | 7/2014 | Srivastava | G06F 16/5838 382/305 |
| 2016/0162758 A1* | 6/2016 | Prest | G06T 7/60 382/159 |
| 2017/0262478 A1* | 9/2017 | Zepeda Salvatierra | G06N 20/00 |
| 2018/0082197 A1* | 3/2018 | Aravamudan | G06F 40/30 |
| 2019/0012334 A1 | 1/2019 | Petrou | |

FOREIGN PATENT DOCUMENTS

| | | |
|---|---|---|
| KR | 10-2011-0028034 A | 3/2011 |
| KR | 10-2014-0087082 A | 7/2014 |
| KR | 10-2016-0092045 A | 8/2016 |
| KR | 10-1806169 B1 | 12/2017 |

* cited by examiner

METHOD FOR PROVIDING INFORMATION RELATED TO GOODS ON BASIS OF PRIORITY AND ELECTRONIC DEVICE THEREFOR

CROSS REFERENCE TO RELATED APPLICATIONS

This application is a National Phase Entry of PCT International Application No. PCT/KR2019/009655, which was filed on Aug. 2, 2019, and claims a priority to Korean Patent Application No. 10-2018-0092580, which was filed on Aug. 8, 2018, the contents of which are incorporated herein by reference.

TECHNICAL FIELD

Various embodiments of the disclosure relate to a method for displaying a search result for products, and an electronic device thereof.

BACKGROUND ART

Electronic devices such as smartphones are widely used enough to be called necessities. Further, with the technological advances in various fields, functions of the electronic devices have been gradually diversified and improved to have high performance. Accordingly, users can use various services through the electronic devices.

For example, various functions using a camera may be provided. In addition to the conventional functions such as image or video capturing, video calls, or the like using the camera, a service which provides information on a subject from an image captured through the camera has also recently been provided. When the information on the subject is applied, it may be possible to realize a service which provides not only direct information on the subject but also other related information, for example, if the subject corresponds to a product, information on the product or a similar product.

DISCLOSURE OF INVENTION

Technical Problem

A service which provides information on a product from an image acquired through a camera or the like may use a similarity between the acquired image and an image for the product. However, if only the similarity of the image is used, a completely different kind of a product may be presented as a result. Although a technology using text information in an image has also be proposed, if a text which is less relevant to a product or an incomplete text string is extracted, an inappropriate product may be presented as a result.

Accordingly, various embodiments of the disclosure may provide a method for providing a search result of a product more conforming to a user's intention, and an electronic device thereof.

Solution to Problem

According to various embodiments of the disclosure, a server may include a communication module, a memory including a database which stores product information in association with one or more product images corresponding to a product and text information related to the product, and a processor. The processor may receive a query image for an external object from an electronic device by using the communication module, select, from the database, a plurality of pieces of product information corresponding to the external object, based on similarities between the one or more product images and the query image, extract the text information for the external object included in the query image, determine a priority among the plurality of pieces of product information, based on a comparison between the extracted text information and the text information included in the selected plurality of pieces of product information, and transmit, to the electronic device, at least some of the plurality of pieces of product information and information on the priority, in response to the reception, by using the communication module.

According to various embodiments of the disclosure, a method of operating a server may include receiving a query image for an external object from an electronic device, selecting a plurality of pieces of product information corresponding to the external object, based on similarities between the one or more product images and the image, from among product information including the one or more product images corresponding to a product and text information related to the product, determining a priority among the plurality of pieces of product information, according to a comparison result between a first vector generated from text information for the external object included in the query image and a second vector generated from text information included in the plurality of pieces of product information, and transmitting, to the electronic device, information on a search result including at least some of the plurality of pieces of product information and information on the priority.

According to various embodiments of the disclosure, an electronic device may include a communication module, a display, a memory, and a processor. The processor may acquire a query image for an external object, transmit the query image to a server by using the communication module, receive information on a search result including information on a priority between at least some of a plurality of pieces of product information selected based on similarities between one or more product images and the query image from among product information including the one or more product images corresponding to a product and text information related to the product and at least one of the plurality of pieces of product information, and display at least one piece of product information among the plurality of product information included in the search result on the display. The priority may be determined based on a comparison between text information for the external object included in the query image and text information included in the plurality of pieces of product information.

Advantageous Effects of Invention

In a method and an electronic device thereof according to various embodiments, products are searched by considering not only text information extracted from an image but also text information derived from the extracted text information, thereby providing a product search result more conforming to a user's intention.

BEST MODE FOR CARRYING OUT THE INVENTION

Hereinafter, various embodiments will be described in greater detail with reference to the accompanying drawings.

Figure 1:
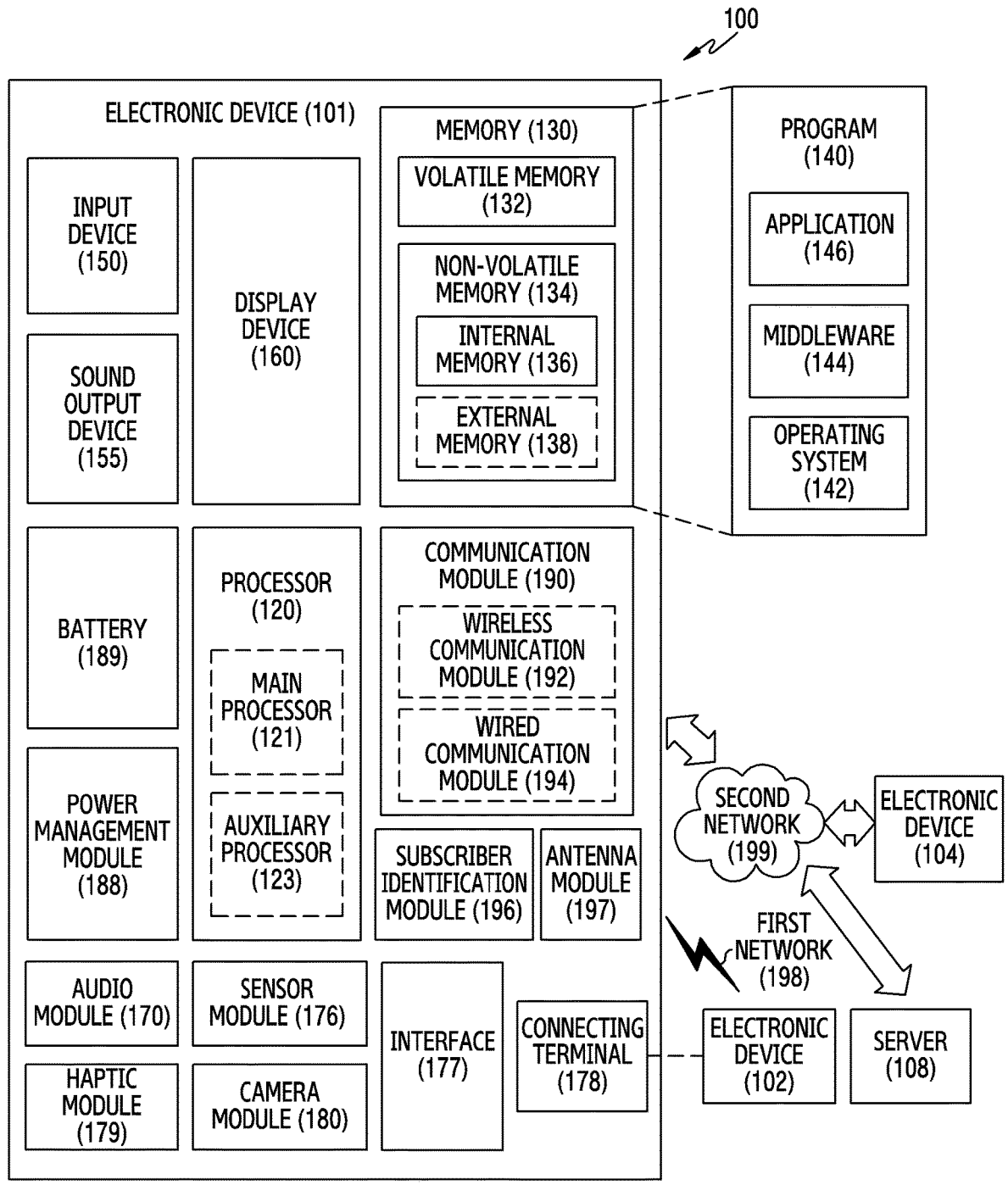
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
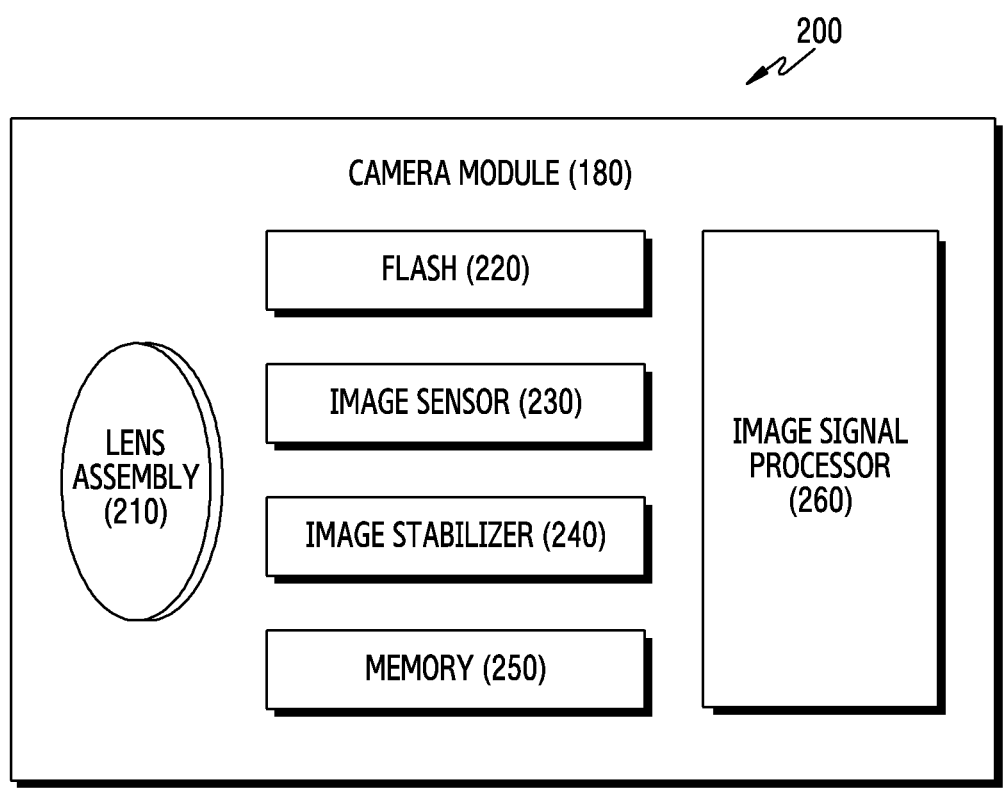
FIG. 2 is a block diagram illustrating a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Various embodiments of the disclosure relate to performing of post-processing on a visual query result according to the purpose of searching for a shopping item, i.e., a product. Specifically, various embodiments of the disclosure relate to a technology in which an image of a category similar to a query image is re-ordered to be disposed to a high ranking position in a search result, based on a similarity of a word.

A product Database (DB) may include not only an image of each of products but also text information indicating various attributes of the respective products. However, when an image is searched for in an image-based manner in which only an image is provided as query information, it may be difficult to utilize the text information of the product.

Although there is a technology which uses text information, the conventional product search technology may utilize text information of a product in such a manner that a logo, brand, or text of the product in a query image is recognized and text matching is performed, that is, whether a detected text exists in product information is determined, and then a ranking in a list of products having the same text is adjusted. However, since the text matching is performed independently of specific category matching of the product or feature matching of images, there is a high possibility that a text not much related to the product is detected. Accordingly, the text may be detected in an incomplete form, for example, in such a form that any character is omitted, which may cause a deterioration of product search performance.

As described above, since the conventional technology provides only a function of re-ordering products through simple comparison of texts, matching of a corresponding text does not reflect a user's demand for finding an object in an image or an object of the same type as the object. In particular, in case of package products, there are many products with similar appearances, and a great amount of text information may be included. Further, when the package products are searched, not only a similarity of the appearance but also a product type is required to be similar. Therefore, there may be a need for an access scheme different from the existing similar image search.

Accordingly, the disclosure provides various embodiments in which whether an object in an image and a found product are similarly in type is recognized, based on a similarity of a word, and displaying of the product is controlled according to whether they are similar in type. According to various embodiments, even if text information extracted from the object in the image does not match text information related to a product stored in a DB, a high priority may be assigned if categories to which the text information belongs are similar. In particular, when a user searches package products, a server simultaneously identifies a similarity that is based on an image and a similarity that is based on text information, and thus products in a shopping list in a pre-selected similar image may be displayed in an order conforming to a user's intention. Accordingly, a technology based on the disclosure can increase a satisfaction of a user who intends to search similar types of products.

Figure 3:
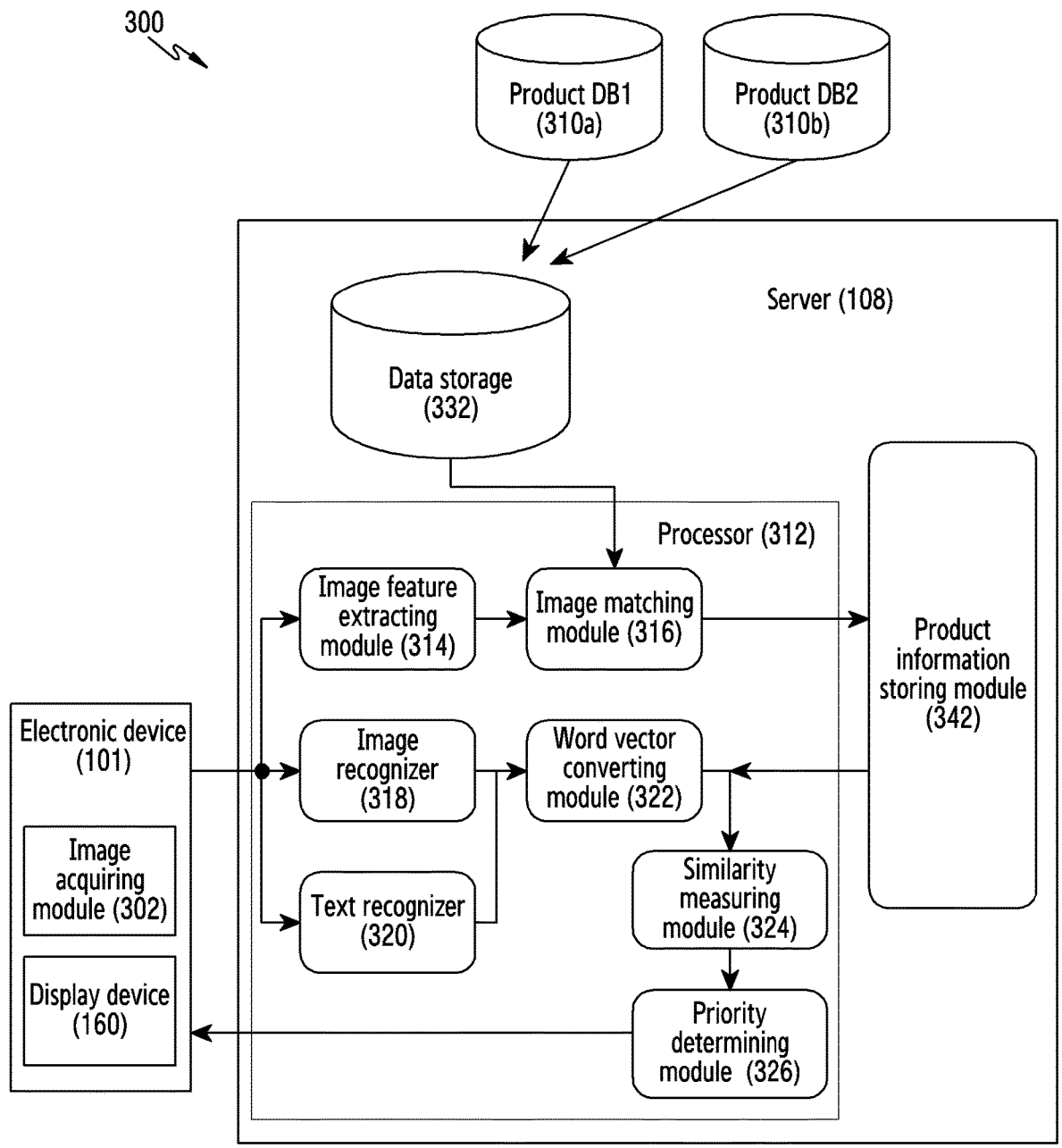
FIG. 3 is a block diagram of an electronic device and a server according to various embodiments.

FIG. 3 is a block diagram 300 of the electronic device 101 and the server 108 according to various embodiments. Referring to FIG. 3, the electronic device 101 may include an image acquiring module 302 and the display device 160. The server 108 may include a processor 312, a data storage 332, and a product information storing module 342.

The electronic device 101 may transmit an image to be queried (hereinafter, referred to as a 'query image') to the server 108, and may display information on products received from the server. The server 108 may search products by using the query image received from the electronic device 101, and may generate and provide information on products to be provided to a user.

The image acquiring module 302 may acquire the query image through a shooting device (e.g., the camera module 180) or a module (e.g., the display device 160) for capturing a screen of an image output device. For example, the query image may be a camera shooting image, a screen capture image, or the like. Alternatively, the image acquiring module 302 may acquire an image stored in a memory (e.g., the memory 130) as the query image. The image stored in the memory may include an image captured previously, an image transmitted from a web or another device (e.g., the electronic device 102, the electronic device 104, etc.), or the like. The display device 160 may display information on products, received from the server 108. Although not shown in FIG. 3, the electronic device 101 may further include the processor 120, and the processor 120 may control operations of the image acquiring module 302 and display device 106.

The processor 312 may control overall operations of the server 108. The processor 312 may include an image feature extracting module 314, an image matching module 316, an image recognizer 318, a text recognizer 320, a word vector converting module 322, a similarity measuring module 324, and a priority determining module 326. According to an embodiment, at least one of the image feature extracting module 314, the image matching module 316, the image recognizer 318, the text recognizer 320, the word vector converting module 322, the similarity measuring module 324, and the priority determining module 326 may be configured in hardware as part of a circuit of the processor 312. Alternatively, at least one of the image feature extracting module 314, the image matching module 316, the image recognizer 318, the text recognizer 320, the word vector converting module 322, the similarity measuring module 324, and the priority determining module 326 may be, as a software module, an instruction/code temporarily resided in the processor 312 or a storage space in which the instruction/code is stored. Operations of the image feature extracting module 314, the image matching module 316, the image matching module 316, the image recognizer 318, the text recognizer 320, the word vector converting module 322, similarity measuring module 324, and the priority determining module 326 may be understood as the operation of the processor 312.

The data storage 332 may store information on candidate products to be searched. The data storage 332 may store product images for a plurality of candidate products that can be provided as a query result and text information related to the candidate products. A set of the product images for the candidate products and the text information related to the candidate products may be referred to as 'product information'. The text information related to the candidate products may include a brand, a manufacturer, a name, a type, a category, or the like. The product information stored in the data storage 332 may be provided from an external database (e.g., a product DB1 310a, a product DB2 310b). Although not shown in FIG. 3, the server 108 may further include a processor and a communication module, and the processor may collect product information from the external database periodically or in an event-driven manner through the communication module, and may store the product information in the data storage 332.

The image feature extracting module 314 may extract at least one feature point of a query image. For example, the image feature extracting module 314 may convert the query image into a state of being easily analyzed, and may extract at least one feature point from the query image in the converted state. The image matching module 316 may search products by using at least one feature point extracted by the image feature extracting module 314. For example, based on the at least one feature point extracted from the query image, the image matching module 316 may determine an image-based similarity between the query image and the product image in the product information stored in the data storage 332, and may select a product image having a similarity greater than or equal to a specific level. The image matching module 316 may provide the product information storing module 342 with product information corresponding to at least one product image having the similarity greater than or equal to the specific level.

The product information storing module 342 may store product information of products found based on an image. For example, the product information storing module 342 may receive product information provided from the image matching module 316, or may read the product information from the data storage 332. Although the data storage 332 and the product information storing module 342 are represented in FIG. 3 as separate components, according to another embodiment, the data storage 332 and the product information storing module 342 may be implemented with the same hardware.

The image recognizer 318 may recognize an external object included in the query image. The image recognizer 318 may analyze the query image to determine a type, name, or the like of an object included in the query image. The text recognizer 320 may recognize texts included in the query image. The text recognizer 320 may use an Optical Character Reader/Recognition (OCR) function to recognize characters, numeric symbols, or the like printed or engraved on the external object included in the query image. Text information derived from a shape of the external object included in the query image may be generated by the image recognizer 318 and the text recognizer 320. The text information may include one or more words.

The word vector converting module 322 may convert the text information generated by the image recognizer 318 and the text recognizer 320 into a vector for determining a similarity. According to an embodiment, the word vector converting module 322 may vectorize the text information such that the similarity is high when a dictionary meaning of the text and related information for a product (e.g., a category of the product, a material of the product, a producing area of the product, or the like) derived from text information are similar or identical. For example, vectorization of the text information may be performed based on a learning model such as a Neural Network Language Model (NNLM), a Recurrent Neural Network Language Model (RNNLM), a Continuous Bag-Of-Words (CBOW), a skip-gram, or the like. Such a model may be a technology designed to advantageously compare a similarity to words having a similar dictionary meaning. When the text information includes a plurality of words, a vector generated by the word vector converting module 322 may include a plurality of sub-vectors.

The similarity measuring module 324 may determine a similarity based on text information between the query image and the stored product information. For example, the similarity measuring module 324 may determine the similarity by using a vector corresponding to the query image and a vector corresponding to the product information stored in the product information storing module 342. The similarity may be evaluated according to an angle between two vectors to be compared.

The priority determining module 326 may determine a priority among products searched according to the similarity based on the text information. The priority determining module 326 may re-order products indicated by the product information stored in the product information storing module 342 according to the similarity based on the text information. According to the similarity based on the text information, the priority determining module 326 may adjust or re-order the priority among the products, determined according to a similarity based on an image. For example, a high priority may be assigned to a product having a high similarity. The high priority allows a corresponding product to be displayed at an upper end of a list when displayed on the electronic device 101. For example, if the similarity based on the image is high and thus a similarity based on text information is low for a product belonging to a high rank, then the priority determining module 326 may adjust a priority of the product to a lower priority. Otherwise, if the similarity based on the text information is high even if the similarity based on the image is low, the priority determining module 326 may re-rank the product to have a high rank.

According to the example of FIG. 3, the word vector converting module 322 may vectorize text information provided from the image recognizer 318 and the text recognizer 320. According to another embodiment, the word vector converting module 322 may further vectorize text information included in product information stored in the product information storing module 342. In order to determine the similarity based on the text information, a query image and vectors corresponding to a selected product may be required.

According to various embodiments, a vectorization operation of generating the vector corresponding to the selected product may be performed during a process in which product information is collected from an external database and then is stored in the data storage 332, or may be performed after products are searched according to a similarity based on an image.

According to various embodiments, a server (e.g., the server 108) may include a communication module, a memory including a database (e.g., the data storage 332) which stores product information in association with one or more product images corresponding to a product and text information related to the product, and a processor (e.g., the processor 312). The processor may receive a query image for an external object from an electronic device (e.g., the electronic device 101) by using the communication module, select, from the database, a plurality of pieces of product information corresponding to the external object, based on similarities between the one or more product images and the query image, extract the text information for the external object included in the query image, determine a priority among the plurality of pieces of product information, based on a comparison between the extracted text information and the text information included in the selected plurality of pieces of product information, and transmit, to the electronic device, at least some of the plurality of pieces of product information and information on the priority, in response to the reception, by using the communication module.

According to various embodiments, the text information may include a name of the object acquired through image recognition for the external object and/or at least one text acquired through text recognition for the query image.

According to various embodiments, the processor (e.g., the processor 312) may determine the priority among the plurality of pieces of product information, according to a comparison result between a first vector generated from the extracted text information for the external object included in the query image and a second vector generated from the text information included in the plurality of pieces of product information.

According to various embodiments, the first vector may be generated to have a high similarity to a vector generated from different text information including a text similar or identical to a dictionary meaning of a word included in the text information and related information for the external object derived from the text information. The related information for the external object may include at least one of an ingredient, a material, a producing area, and a category.

According to various embodiments, the text information may include a plurality of words. The first vector may include a plurality of sub-vectors. The plurality of pieces of product information may include first product information and second product information. The comparison result between the first vector and the second vector may include a similarity to the first product information and a similarity to the second product information. The similarity to the first product information may include an average value of comparison values between the plurality of sub-vectors and sub-vectors generated from text information included in the first product information.

According to various embodiments, each of the comparison values may be determined based on an angle difference value between one of the plurality of sub-vectors generated from the query image and one of the sub-vectors generated from the text information for a first product.

According to various embodiments, the processor (e.g., the processor 312) may collect a product image for a plurality of candidate products and text information related to the candidate products from an external database (e.g., the product DB1 310a, the product DB2 310b).

According to various embodiments, an electronic device (e.g., the electronic device 101) may include a communication module (e.g., the communication module 190), a display (e.g., the display device 160), a memory (e.g., the memory 130), and a processor (e.g., the processor 120). The processor may acquire a query image for an external object, transmit the query image to a server (e.g., the server 108) by using the communication module, receive information on a search result including information on a priority between at least some of a plurality of pieces of product information selected based on similarities between one or more product images and the query image from among product information including the one or more product images corresponding to a product and text information related to the product and at least one of the plurality of pieces of product information, and display at least one piece of product information among the plurality of product information included in the search result on the display. The priority may be determined based on a comparison between text information for the external object included in the query image and text information included in the plurality of pieces of product information.

According to various embodiments, the processor (e.g., the processor 120) may acquire the query image by performing shooting using a shooting device (e.g., the camera module 180) provided in the electronic device (e.g., the electronic device 101), by capturing an image displayed on the display (e.g., the display device 160), or by reading a file stored in the memory (e.g., the memory 130).

According to various embodiments, the processor (e.g., the processor 120) may display, on the display, a screen (e.g., the screen 1110) in which the query image is disposed at an upper end and at least some of the plurality of pieces of product information are disposed at a lower end according to an order based on the priority.

According to various embodiments, the screen (e.g., the screen 1120 or the screen 1130) may further include at least one of additional information including a link capable of additionally searching products related to a key word related to one of the plurality of pieces of product information or additional information indicating common features of the plurality of pieces of product information.

According to various embodiments, the processor (e.g., the processor 120) may identify the priority, based on orders of address values corresponding to at least some of the plurality of pieces of product information included in information on the search result.

According to various embodiments, the processor (e.g., the processor 120) may execute a camera application for acquiring the query image, and may display, on the display, a screen (e.g., the screen 1310) including a guidance phrase for disposing the external object.

Hereinafter, the disclosure will describe operations of the electronic device 101 and server 108 having the aforementioned structures. For convenience of explanation, hereinafter, a 'similarity based on an image' may be referred to as an 'image-based similarity', and a 'similarity based on text information' may be referred to as a 'text-based similarity'. In addition, texts derived directly through text recognition or image recognition for a query image may be referred to as 'text information', and texts derived secondarily or indirectly from the text information may be referred to as 'related information', 'related word', 'indirect information', or the like.

Figure 4:
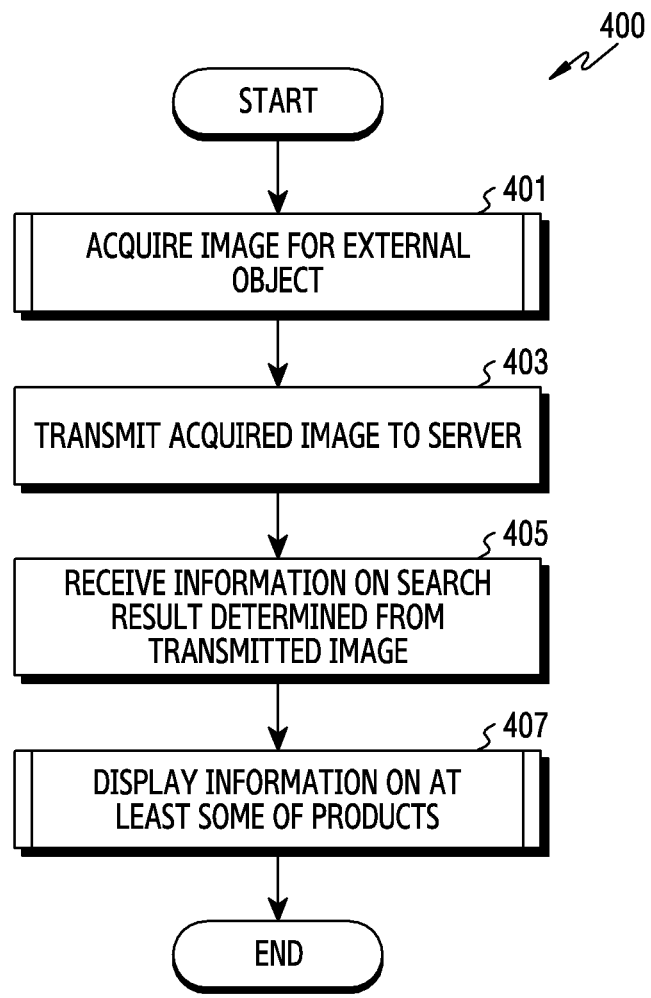
FIG. 4 is a flowchart for providing a product search service in an electronic device according to various embodiments.

FIG. 4 is a flowchart 400 for providing a product search service in the electronic device 101 according to various embodiments. An operational entity of the flowchart 400 exemplified in FIG. 4 may be understood as the electronic device 101 or a component (e.g., the processor 120) of the electronic device 101.

Referring to FIG. 4, in operation 401, the electronic device 101 (e.g., the processor 120) may acquire an image for an external object. For example, the image may be acquired by a shooting device (e.g., the camera module 180) provided in the electronic device 101, or may be acquired by capturing an image displayed on a screen, or may be acquired from a file stored in a storage device (e.g., the memory 130).

In operation 403, the electronic device 101 may transmit the acquired image to the server 108. The electronic device 101 may transmit the acquired image to the server 108 through the communication module 190. The electronic device 101 may transmit the acquired image to the server 108 as a query image. For example, the electronic device 101 may packetize the acquired image in a format defined for product search, and then may transmit a packet of the format defined for product search, including the acquired image. As another example, the electronic device 101 may transmit the acquired image together with a request for product search.

In operation 405, the electronic device 101 may receive, from the server 108, information on a search result determined from the transmitted image. The information on the search result may include information on products and information on a priority among the products. The information on the products may include an address value (e.g., Uniform Resource Location (URL)) capable of accessing information required to purchase a product. The information on the priority may be explicitly or implicitly indicated. For example, a priority of products may be implicitly represented through an order by which address values are listed.

In operation 407, the electronic device 101 may display information on at least some of products. The electronic device 101 displays information on products on the display device 160. In this case, information on all products indicated by a search result or information on some of the products may be displayed. When the information on the products included in the search result indicates address values, the electronic device 101 may acquire information regarding purchasing of products by using the address values (e.g., request or receive the information by using a URL), and then may display the information regarding purchasing of the products.

Figure 5:
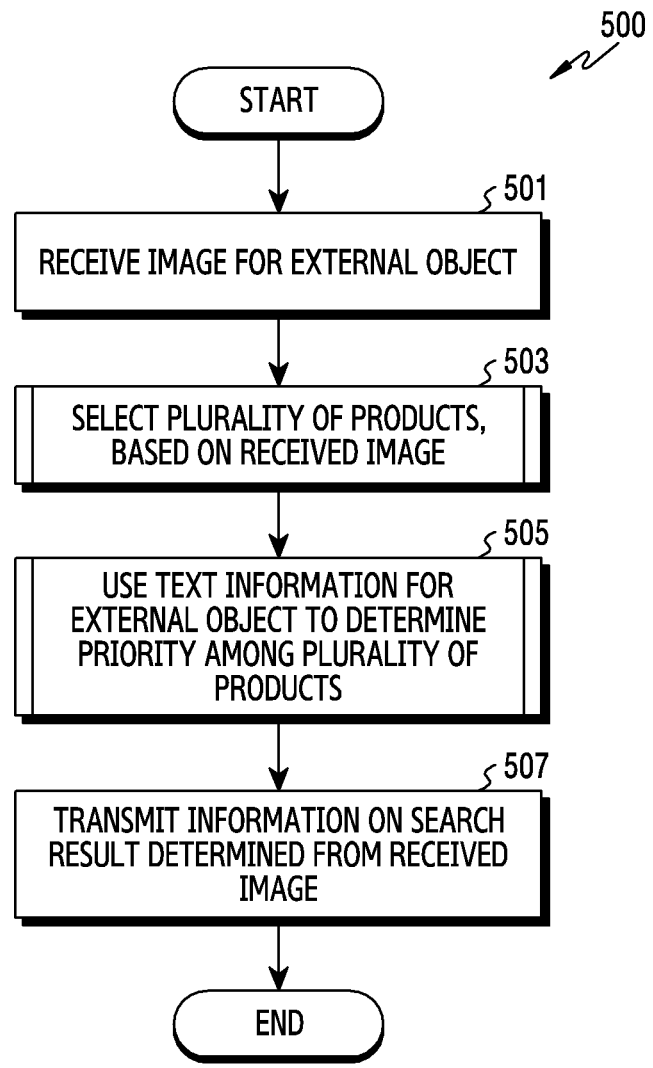
FIG. 5 is a flowchart for providing information on products in a server according to various embodiments.

FIG. 5 is a flowchart 500 for providing information on products in the server 108 according to various embodiments. An operational entity of the flowchart 500 exemplified in FIG. 5 may be understood as the server 108 or a component (e.g., the processor 312) of the server 108.

Referring to FIG. 5, in operation 501, the server 108 (e.g., the processor 312) may receive an image for an external object. The image may be received from the electronic device 101. The image may be received together with a request for product search.

In operation 503, the server 108 may select a plurality of products, based on the received image. The server 108 may measure image-based similarities between an image received for product search, i.e., a query image, and product images included in previously collected product information, and may select a plurality of products according to the measured similarities. For example, products having a similarity greater than or equal to a threshold may be selected.

In operation 505, the server 108 may use text information for an external object to determine a priority among the plurality of products. The server 108 may use text information acquired from the query image to adjust or re-order a priority determined according to an image-based similarity. For example, the server 108 may generate the text information for the external object from the query image and vectorize the generated text information to generate a vector corresponding to the query image, and then may use the generated vector to determine a text-based similarity and determine a priority based on the text-based similarity.

In operation 507, the server 108 may transmit, from the server 108, information on a search result determined from the query image. The information on the search result may include information on a plurality of products and information on a priority among the plurality of products. The information on the priority may be indicated explicitly or implicitly. When the information on the priority is indicated explicitly, the server 108 may transmit values indicating a priority together with address values capable of accessing information required to purchase a product. When the information on the priority is indicated implicitly, the server 108 may adjust a disposition order of the address values capable of accessing the information required to purchase the product according to a priority, and then may transmit the address values.

In the embodiment described with reference to FIG. 5, the server 108 may determine a priority among a plurality of selected products and then transmit information on at least some of the plurality of products. According to another embodiment, the server 108 may exclude at least one of the plurality of selected products, based on a text-based similarity. In other words, the server 108 may delete at least one of products stored in the product information storing module 342, based on the text-based similarity. For example, the server 108 may exclude at least one product having an image-based similarity less than or equal to a reference value. As another example, the server 108 may exclude at least one remaining product in addition to a predetermined number of products having a high ranking image-based similarity (e.g., 10 products in descending order of the image-based similarity). In this case, according to another embodiment, if the number of selected products is less than or equal to a threshold, the server 108 may omit the exclusion operation even if there is a product having an image-based similarity less than or equal to the reference value.

In the embodiment described with reference to FIG. 5, the server 108 may transmit information on a search result including information on a plurality of products. Herein, products indicated by the search result may be all or some of products selected in the operation 503. Information on some of the plurality of products may be transmitted by considering an amount of product information that can be displayed simultaneously in the electronic device 101, and then information on the remaining products among the plurality of products may be further transmitted according to an additional request from the electronic device 101.

Figure 6:
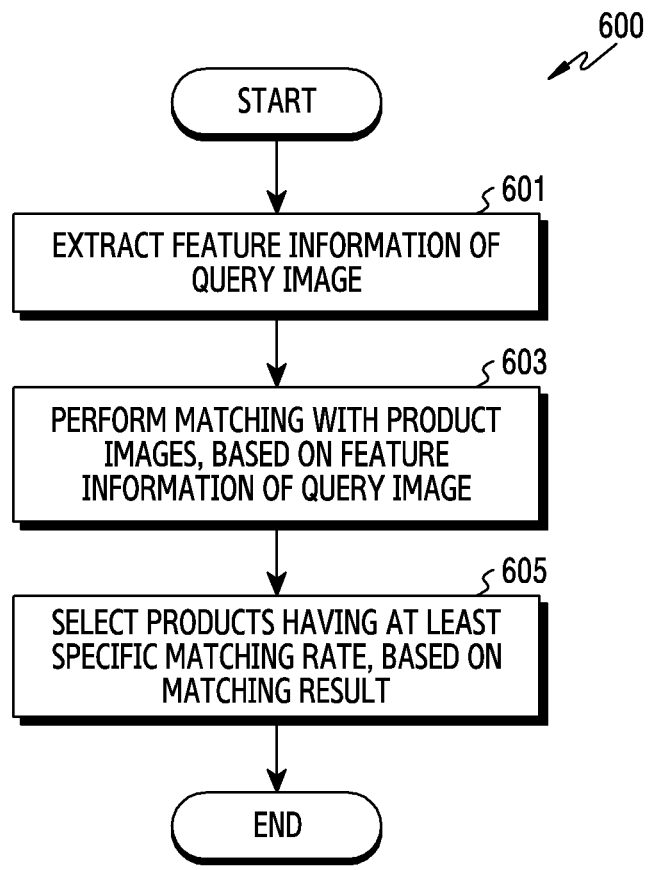
FIG. 6 is a flowchart for searching products in a server, based on an image, according to various embodiments.

FIG. 6 is a flowchart 600 for searching products in the server 108, based on an image, according to various embodiments. FIG. 6 is an example for the operation 503 of FIG. 5, and an operational entity of the flowchart 600 exemplified in FIG. 6 may be understood as the server 108 or a component (e.g., the processor 312) of the server 108.

Referring to FIG. 6, in operation 601, the server 108 (e.g., the processor 312) may extract feature information of a query image. For example, the server 108 may convert (e.g., filtering, segmentation, or the like) the query image into a state of being easily analyzed, and may extract at least one piece of feature information from the query image in the converted state. The feature information may include a location of a feature point and a descriptor corresponding to the location.

In operation 603, the server 108 may perform matching with product images stored in the data storage 332, based on the feature information of the query image. Through matching between the images, the server 108 may measure an image-based similarity, and may determine a matching rate for the query image for each product image from the image-based similarity.

The server 108 may perform an operation of comparing the query image and the product image stored in the server 108. The operation of comparing the images may be performed through an operation of comparing the feature information of the query image and feature information of the product images. The feature information may be generally represented in the form of a vector, and the server 108 may recognize a similarity between two images according to a scheme of calculating a similarity of the vector. For example, the image-based similarity may be represented by a numeric value in the range of 0 and 1. The server 108 may sequentially extract a product image which is most similar to the query image, based on the numeric value. The server 108 may manage product images of which a similarity to the query image is high as separate data. For example, the server 108 may manage high ranking N products of which an image-based similarity is high among products as a separate list, similarly to the product information storing module 342. The list may be stored in the server 108, or may be transmitted to the electronic device 101.

In operation 605, the server 108 may select products having at least a specific matching rate, based on a matching result. The server 108 may identify at least one product image having a similarity greater than or equal to a specific level, and may identify a product corresponding to the identified product image.

Figure 7:
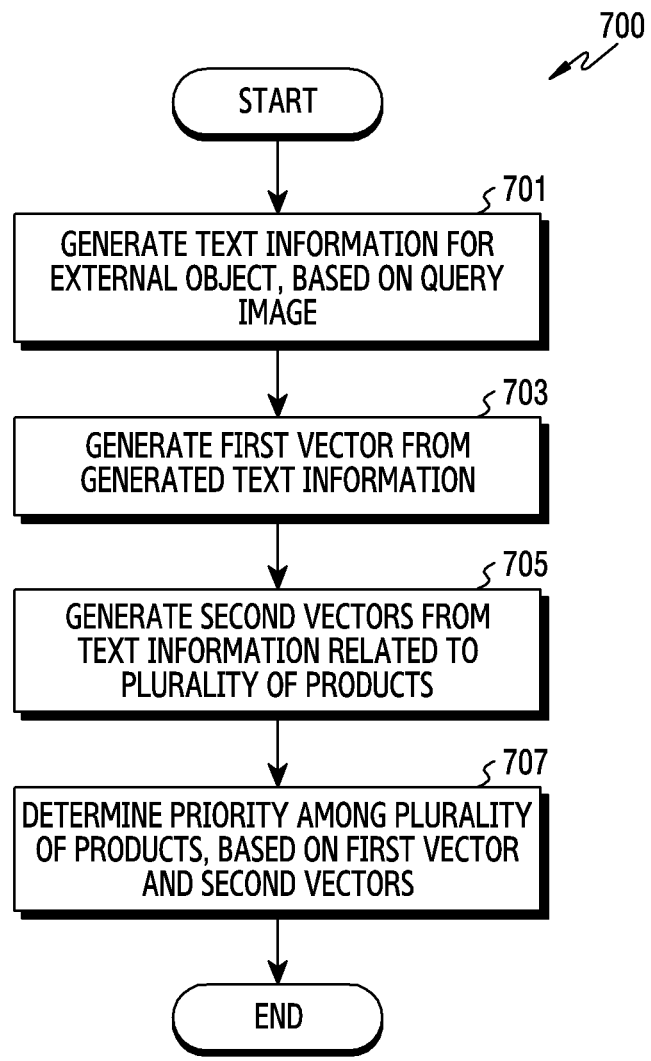
FIG. 7 is a flowchart for determining a priority among products, based on text information, in a server according to various embodiments.
Figure 8:
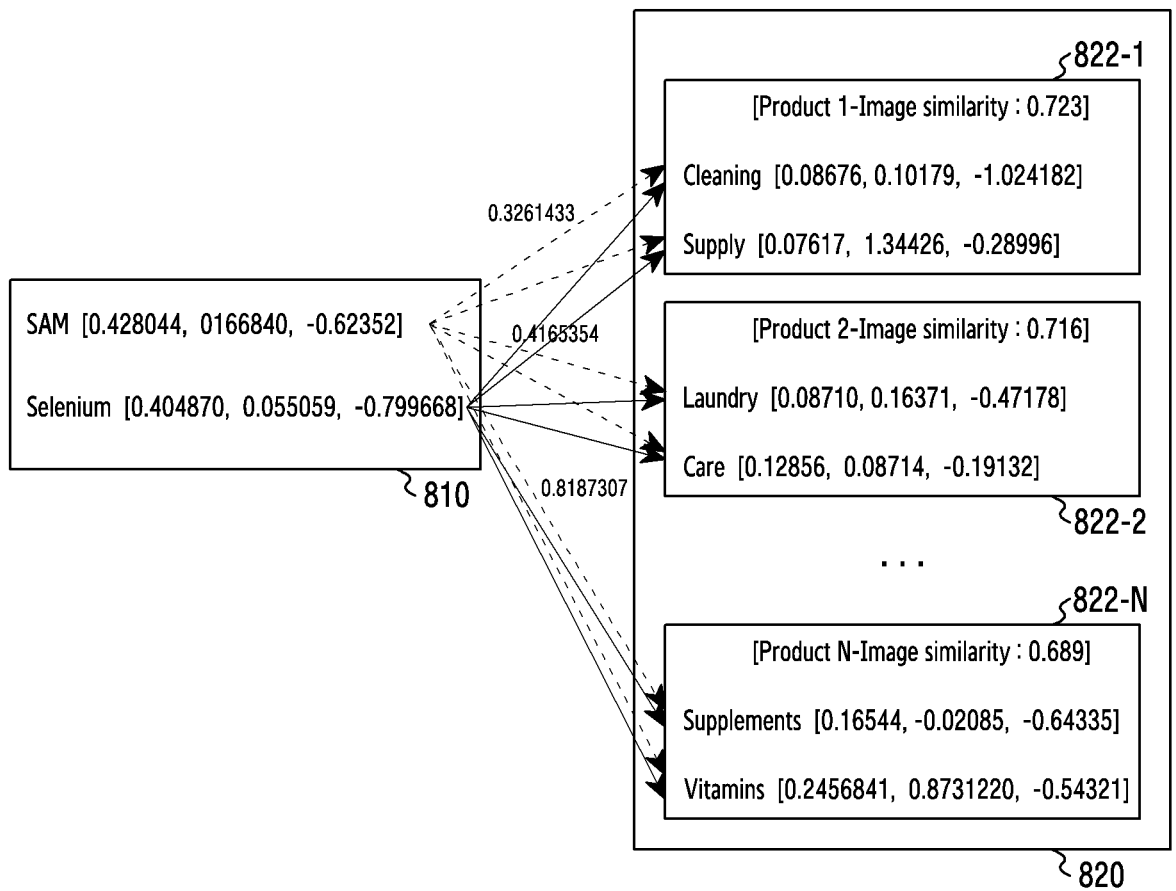
FIG. 8 is an example of a vectorization result of text information according to various embodiments.

FIG. 7 is a flowchart 700 for determining a priority among products, based on text information, in the server 108 according to various embodiments. FIG. 8 is an example of a vectorization result of text information according to various embodiments. FIG. 7 is an example for the operation 505 of FIG. 5, and an operational entity of the flowchart 700 exemplified in FIG. 7 may be understood as the server 108 or a component (e.g., the processor 312) of the server 108.

In operation 701, the server 108 (e.g., the processor 312) may generate text information for an external object, based on a query image. The text information for the external object may be acquired through image recognition and text recognition for the query image. For example, the text information may include a name according to an image recognition result of the external object and a text represented on the external object according to a text recognition result. For example, as exemplified in FIG. 8, text information 810 generated from the query image may include 'SAM' and 'Selenium'.

In operation 703, the server 108 may generate a first vector from the generated text information. According to an embodiment, the server 108 may generate the first vector to have a high similarity to a vector generated from different text information including a dictionary meaning of the text and related information for a product (e.g., a category, an ingredient, a material, a producing area, etc.) derived from text information. According to an embodiment, the server 108 may identify related information for the text information acquired from the query image (e.g., identify it by using a dictionary database related to a word), and then may vectorize the text information by reflecting the related information. For example, the first vector may be generated based on a learning model such as an NNLM, an RNNLM, a CBOW, a skip-gram, or the like. Accordingly, the first vector corresponding to the query image may be determined by reflecting not only the text information but also the related information. For example, as exemplified in FIG. 8, 'SAM' and 'Selenium' included in the text information 810 generated from the query image may be vectorized to [0.428044, 0.168840, −0.62352] and [0.404870, 0.55059, −0.799668].

In operation 705, the server 108 may generate second vectors from text information related to a plurality of products. The server 108 may identify text information included in product information of a plurality of products selected according to an image-based similarity, and may generate second vectors corresponding to the plurality of products from the text information. For example, as exemplified in FIG. 8, when N products are selected, text information 822-1 for a first product may be 'Cleaning' and 'Supply' and a corresponding generated vector may be [0.08676, 0.10179, −1.024182]. Text information 822-2 for a second product may be 'Laundry' and 'Care', and corresponding generated vectors may be [0.08710, 0.16371, −0.47178] and [0.12856, 0.08714, −0.19132]. Text information 822-N for an N-th product may be 'Supplements' and 'Vitamins', and corresponding generated vectors may be [0.16544, −0.02085, −0.64335] and [0.2456841, 0.8731220, −0.54321].

In operation 707, the server 108 may determine a priority among a plurality of products, based on the first vector and the second vectors. The priority may be determined according to a text-based similarity determined according to comparison between the vectors. When each of the first vector and the second vectors includes a plurality of sub-vectors, the text-based similarity may be determined as an average of comparison results for the respective sub-vectors. For example, in case of FIG. 8, the text information 810 corresponding to the query image includes two sub-vectors, and each piece of the text information 822-1, 822-2, and 822-N corresponding to respective products includes two sub-vectors. When determining the text-based similarity to the first product, four comparison values may be calculated for four sub-vector pairs that can be combined between two sub-vectors generated from the text information 810 corresponding to the query image and two sub-vectors generated from the text information 822-1 corresponding to the first product, and the server 108 may determine the text-based similarity by averaging the four comparison values. Herein, the comparison value may be an angle difference value between the two sub-vectors. According to another embodiment, in the averaging of the plurality of comparison values, different weights may be assigned according to attributes of corresponding texts. For example, when an ingredient of a product is more important, a relatively higher weight may be assigned to a sub vector (e.g., [0.404870, 0.55059, −0.799668]) generated from a text (e.g., 'Selenium') indicating the ingredient.

Figure 9:
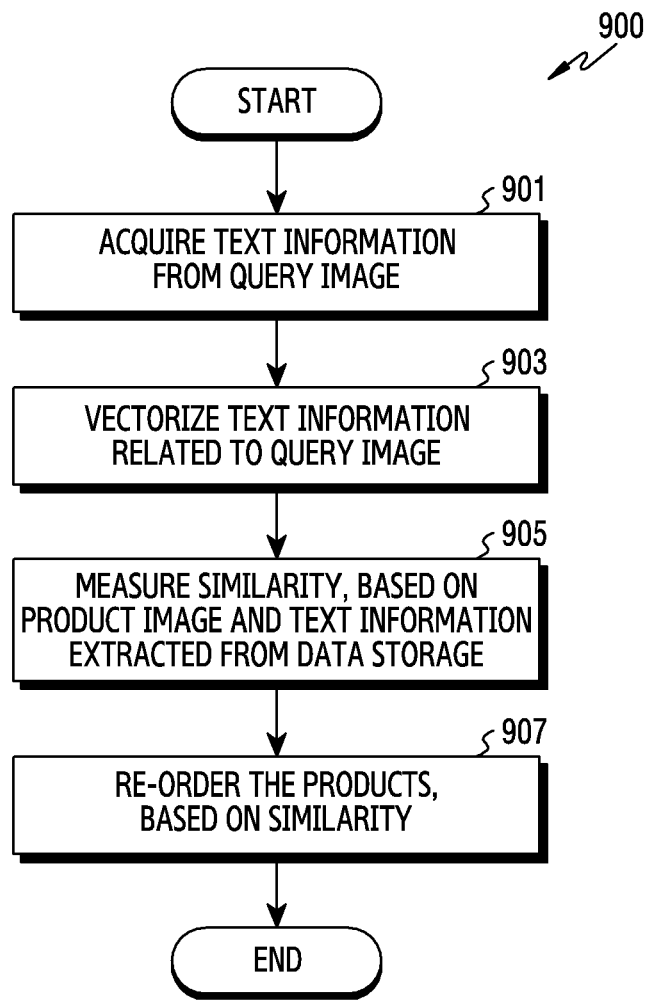
FIG. 9 is a flowchart for determining a priority among products, based on text information, in a server according to various embodiments.

FIG. 9 is a flowchart 900 for determining a priority among products, based on text information, in the server 108 according to various embodiments. FIG. 9 is an example for the operation 505 of FIG. 5, and an operational entity of the flowchart 900 illustrated in FIG. 9 may be understood as the server 108 or a component (e.g., the processor 312) of the server 108.

Referring to FIG. 9, in operation 901, the server 108 (e.g., the processor 312) may acquire text information from a query image. The server 108 may not only extract feature information of the query image but also extract text information related to the query image. The text information may be a real text included in the query image extracted by using OCR or the like, and may include a category name, image title, product name, or the like extracted by the image recognizer 318.

In operation 903, the server 109 may vectorize the text information related to the query image. The server 108 may vectorize text information (e.g., text information acquired through text recognition and image recognition) derived directly from the query image by considering related information derived indirectly from the query image. For example, the related information derived indirectly may include information (e.g., a category, an ingredient, a producing area, a material, or the like) identified through a predefined dictionary from an external object represented by the query image.

In operation 905, the server 108 may measure a similarity, based on a product image and text information extracted from a data storage. The server 108 may compare a vector acquired through vectorization for the text information of the query image and vectors acquired from text information for products listed in advance. The text information for products may include a product name, a category, a description, or the like. The text information for products may be compared after being vectorized together with the text information of the query image. In this case, the comparison operation may conform to a scheme of comparing each word. According to another embodiment, a method to be used may include calculating of a similarity through comparison on a representative word, calculating of an average on words having a high similarity, and averaging of data except for an outlier by considering a distribution of a word similarity, or the like. Through such a method, the server 108 may calculate a text-based similarity between the query image and products included in the list.

In operation 907, the server 108 may re-order the products, based on the similarity. Products selected through the image-based similarity may be re-ordered through calculation of the text-based similarity. The server 108 may comprehensively consider the image-based similarity and the text-based similarity. For example, the server 108 may re-order the products in a descending order of averages of the image-based similarity and text-based similarity. If it is necessary to primarily determine the image-based similarity according to a product category, the server 108 may assign a high weight to the image-based similarity. Otherwise, the server 108 may assign the high weight to the text-based similarity.

Figure 10:
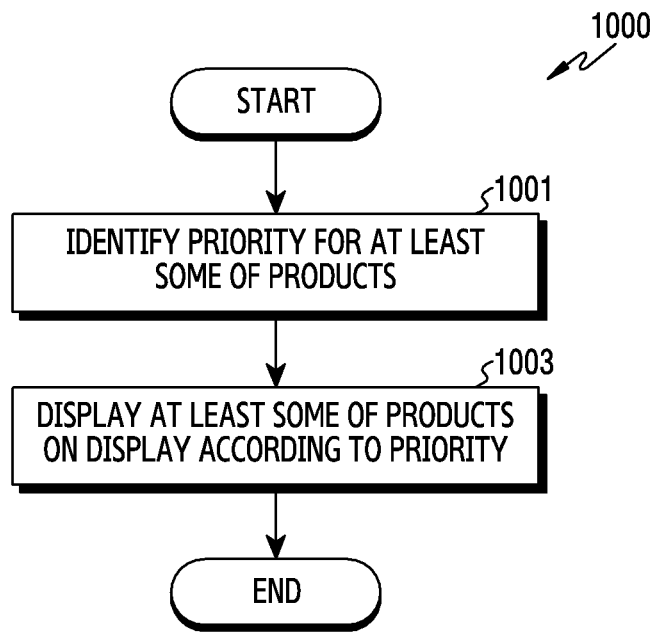
FIG. 10 is a flowchart for displaying information on products in an electronic device according to various embodiments.
Figure 11A:
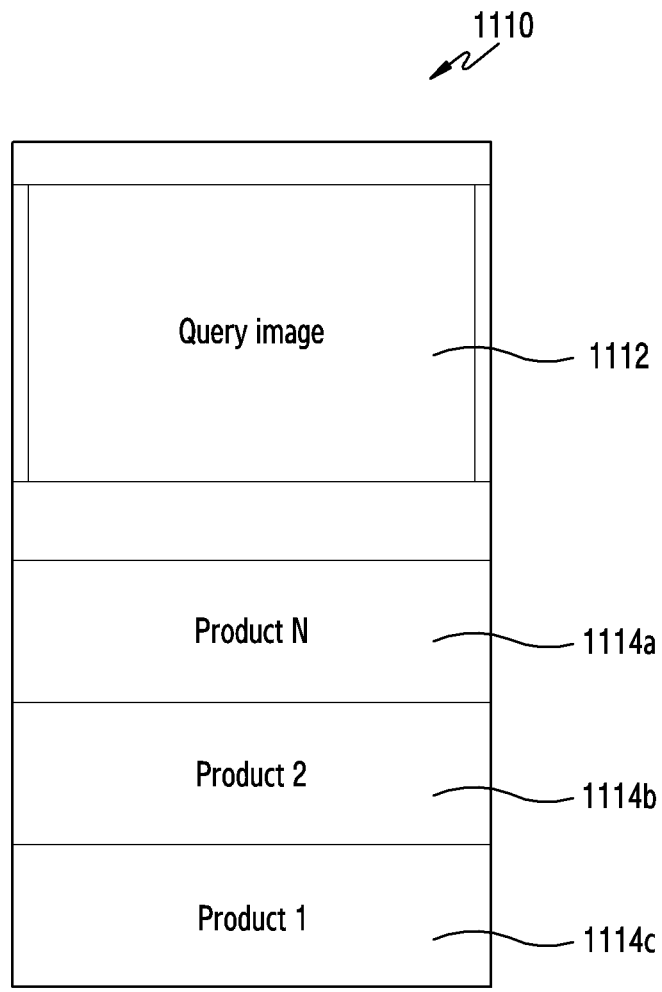
FIGS. 11A-11C are examples of information on products displayed in an electronic device according to various embodiments.
Figure 11B:
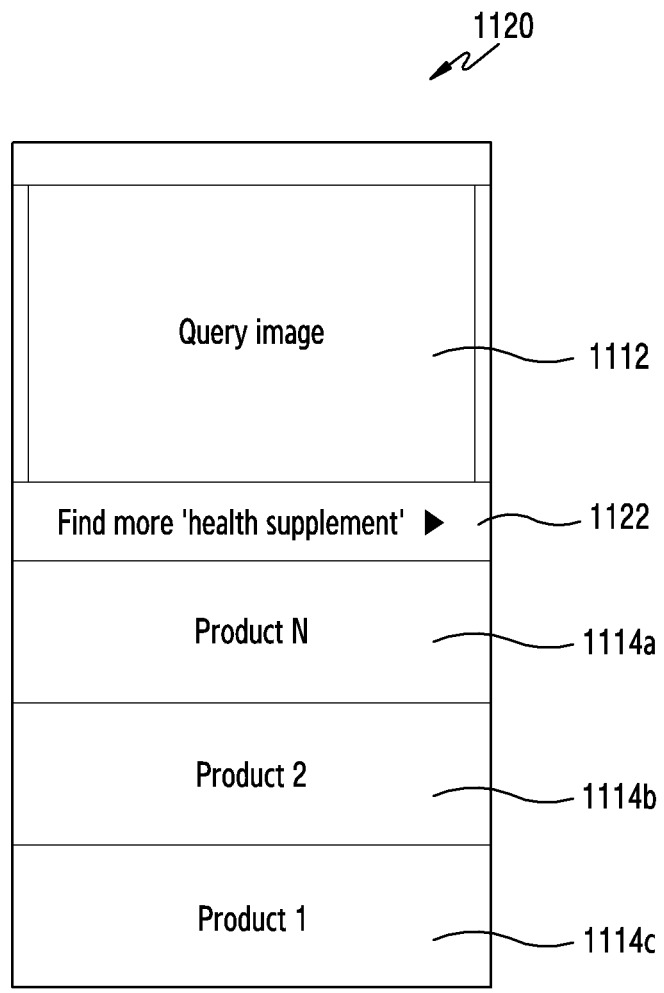
Figure 11C:
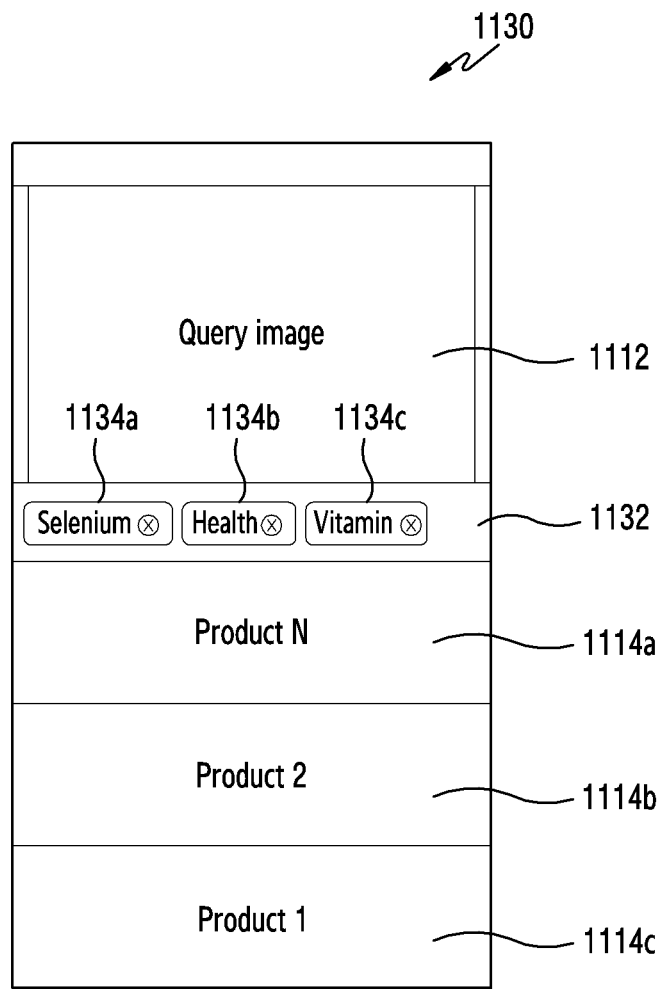

FIG. 10 is a flowchart 1000 for displaying information on products in the electronic device 101 according to various embodiments. FIG. 11A to FIG. 11C are examples of information on products displayed in the electronic device 101 according to various embodiments. FIG. 10 is an example for the operation 407 of FIG. 4, and an operational entity of the flowchart 1000 illustrated in FIG. 10 may be understood as the electronic device 101 or a component (e.g., the processor 120) of the electronic device 101.

Referring to FIG. 10, in operation 1001, the electronic device 101 (e.g., the processor 120) may identify a priority for at least some of products. Herein, the products may include products indicated by information on a plurality of products received from the server 108. Herein, the priority may be indicated explicitly or implicitly. For example, when the priority conforms to an order of address values capable of accessing information required to purchase a product, the electronic device 101 may identify the priority according to the order of address values.

In operation 1003, the electronic device 101 may display at least some of the products on a display (e.g., the display device 160) according to the priority. According to a screen size of the display provided in the electronic device 101, only information on some of the products may be displayed if information on the received products cannot be displayed at the same time. Thereafter, information on the remaining products may be displayed according to a drag input of a user. For example, as shown in FIG. 11A, the electronic device 101 may display a search result screen 1110 including a query image 1112 at an upper end and sequentially including an N-th product 1114a, a second product 1114b, and a first product 1114c at a lower end according to a priority.

According to another embodiment, the electronic device 101 may display additional information utilizing a keyword related to a product having a high similarity to text information extracted from the query image. For example, as shown in FIG. 11B, the electronic device 101 may display a search result screen 1120 including the query image 1112 at an upper end, sequentially including the N-th product 1114a, the second product 1114b, and the first product 1114c at a lower end according to a priority, and further including a keyword related to a specific product at a middle portion. Herein, the additional information 1122 may include a link capable of additionally searching products related to a corresponding keyword. To this end, the server 108 may transmit an address value for additional search or information on a keyword related to a product having a high score in terms of a similarity.

According to another embodiment, the electronic device 101 may further display an item (e.g., a button) to additionally search products which have a common feature of products having a high similarity to the text information extracted from the query image. For example, as shown in FIG. 11C, the electronic device 101 may display a search result screen 1130 including the query image 1112 at an upper end, sequentially including the N-th product 1114a, the second product 1114b, and the first product 1114c at a lower end according to a priority, and further including a first button 1134a, a second button 1134b, and a second third button 1134bc as items indicating common features of products at a middle portion. To this end, the server 108 may transmit, to the electronic device 101, address values for additional search or information on features to be represented through buttons.

Figure 12:
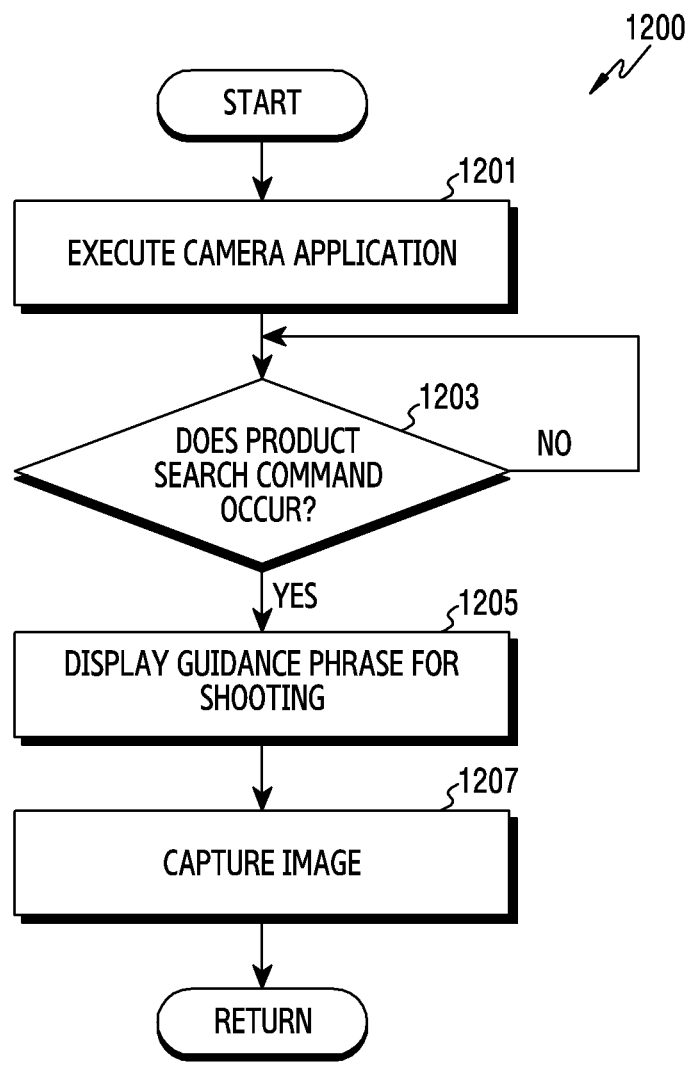
FIG. 12 is a flowchart for acquiring a query image for product search in an electronic device according to various embodiments.
Figure 13:
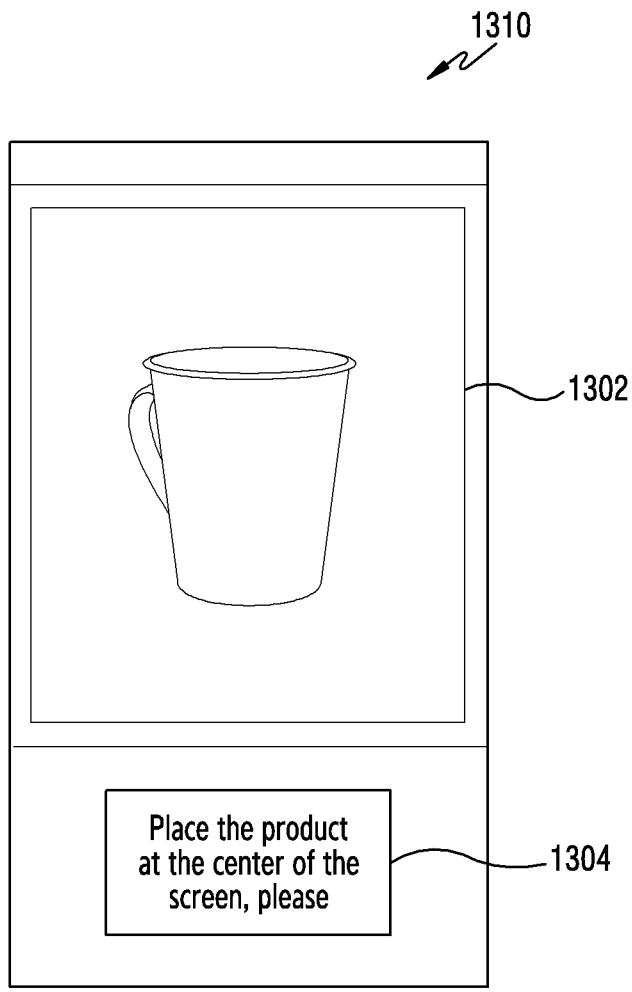
FIG. 13 is an example of a shooting interface including a guidance phrase in an electronic device according to various embodiments.

FIG. 12 is a flowchart 1200 for acquiring a query image for product search in the electronic device 101 according to various embodiments. FIG. 13 is an example of a shooting interface including a guidance phrase in the electronic device 101 according to various embodiments. FIG. 12 is an example for the operation 401 of FIG. 4, and an operational entity of the flowchart 1200 exemplified in FIG. 12 may be understood as the electronic device 101 or a component (e.g., the processor 120) of the electronic device 101.

Referring to FIG. 12, in operation 1201, the electronic device 101 (e.g., the processor 120) may execute a camera application. The electronic device 101 may execute the camera application, in response that a user touches an icon of the camera application. Accordingly, the electronic device 101 may activate the camera module 180.

In operation 1203, the electronic device 101 may determine whether a product search command occurs. For example, an execution screen of the camera application may include a button for product search. Upon detecting that the button for product search is touched, the electronic device 101 may recognize the occurrence of the product search command.

In operation 1205, the electronic device 101 may display a guidance phrase for shooting. The guidance phrase may be an interface which describes a matter required to a user in order to capture a query image so that information on an external object can be easily extracted. For example, as shown in FIG. 13, the electronic device 101 may display a screen 1310 including a preview image 1302 at an upper end and a guidance phrase 1304 at a lower end. In the example of FIG. 13, although the guidance phrase 1304 includes a sentence "Place the product at the center of the screen, please", this is only an example, and thus it is possible to include another sentence. In addition, in the example of FIG. 13, although the guidance phrase 1304 is displayed in a region separated from the preview image 1302, this is only an example, and thus at least part of the guidance phrase 1304 may be displayed to overlap with the preview image 1302.

In operation 1207, the electronic device 101 may capture an image. According to an embodiment, the image may be captured in response to a touch input of a user's shooting button. According to another embodiment, the image may be captured without a user's touch input in response that a pre-defined condition is satisfied. For example, the pre-defined condition may be defined such that the same subject is captured on a preview screen for at least a specific period of time, or the subject is located in a specific region of a camera angle, or the like.

According to various embodiments, a method of operating a server (e.g., the server 108) may include receiving a query image for an external object from an electronic device (e.g., the electronic device 101), selecting a plurality of pieces of product information corresponding to the external object, based on similarities between the one or more product images and the image, from among product information including the one or more product images corresponding to a product and text information related to the product, determining a priority among the plurality of pieces of product information, according to a comparison result between a first vector generated from text information for the external object included in the query image and a second vector generated from text information included in the plurality of pieces of product information, and transmitting, to the electronic device, information on a search result including at least some of the plurality of pieces of product information and information on the priority.

According to various embodiments, the text information may include a name of the object acquired through image recognition for the external object and/or at least one text acquired through text recognition for the query image.

According to various embodiments, the first vector may be generated to have a high similarity to a vector generated from different text information including a word similar or identical to a dictionary meaning of a word included in the text information and related information for the external object derived from the text information. The related information for the external object may include at least one of an ingredient, a material, a producing area, and a category.

According to various embodiments, the first vector may be generated by using a learning model based on one of a Neural Network Language Model (NNLM), a Recurrent Neural Network Language Model (RNNLM), a Continuous Bag-Of-Words (CBOW), and a skip-gram.

According to various embodiments, the method of operating the server (e.g., the server 108) may further include collecting a product image for a plurality of candidate products and text information related to the candidate products from an external database (e.g., the product DB1 310a, the product DB2 310b).

According to various embodiments, the text information may include a plurality of words. The first vector may include a plurality of sub-vectors. The plurality of pieces of product information may include first product information and second product information. The comparison result between the first vector and the second vector may include a similarity to the first product information and a similarity to the second product information. The similarity to the first product information may include an average value of comparison values between the plurality of sub-vectors and sub-vectors generated from text information included in the first product information.

According to various embodiments, each of the comparison values may be determined based on an angle difference value between one of the plurality of sub-vectors generated from the query image and one of the sub-vectors generated from the text information included in the first product information.

The aforementioned search technology according to various embodiments performs re-ordering of a priority by using a text-based similarity, thereby presenting not only the same object as an object to be searched for by a user but also other products belonging to the same category. Therefore, the search technology according to various embodiments can provide a satisfactory result which meets a user's search purpose.

Figure 14:
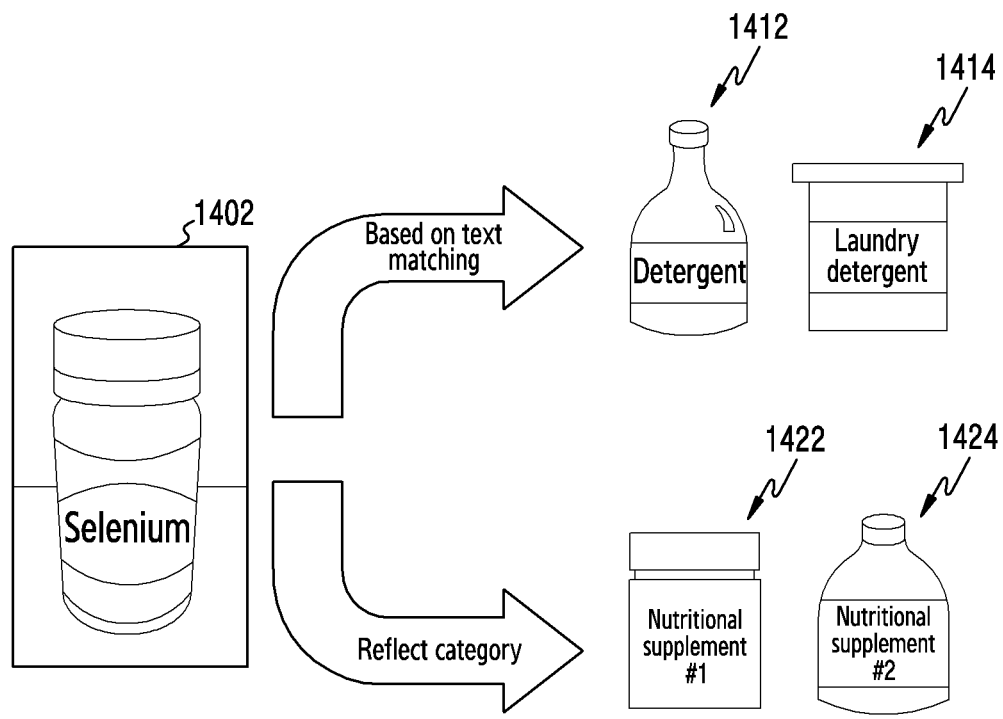
FIGS. 14-16 are examples of a search result through a product search service according to various embodiments.
Figure 15:
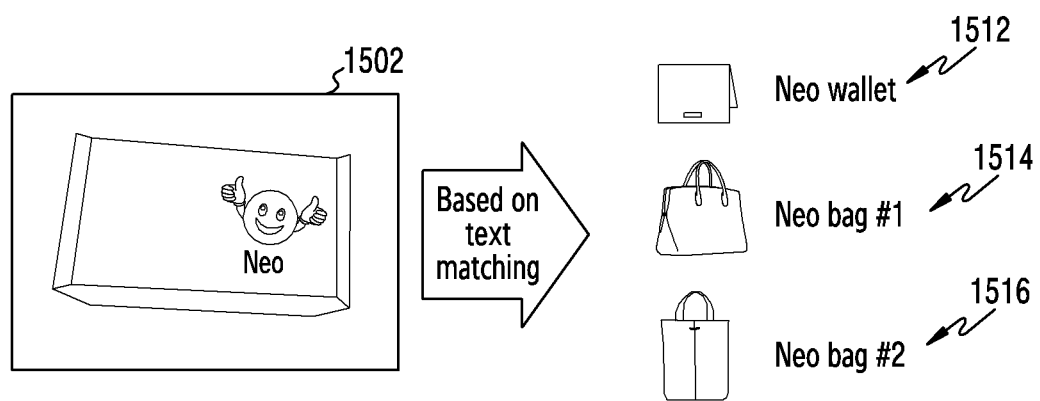
Figure 16:
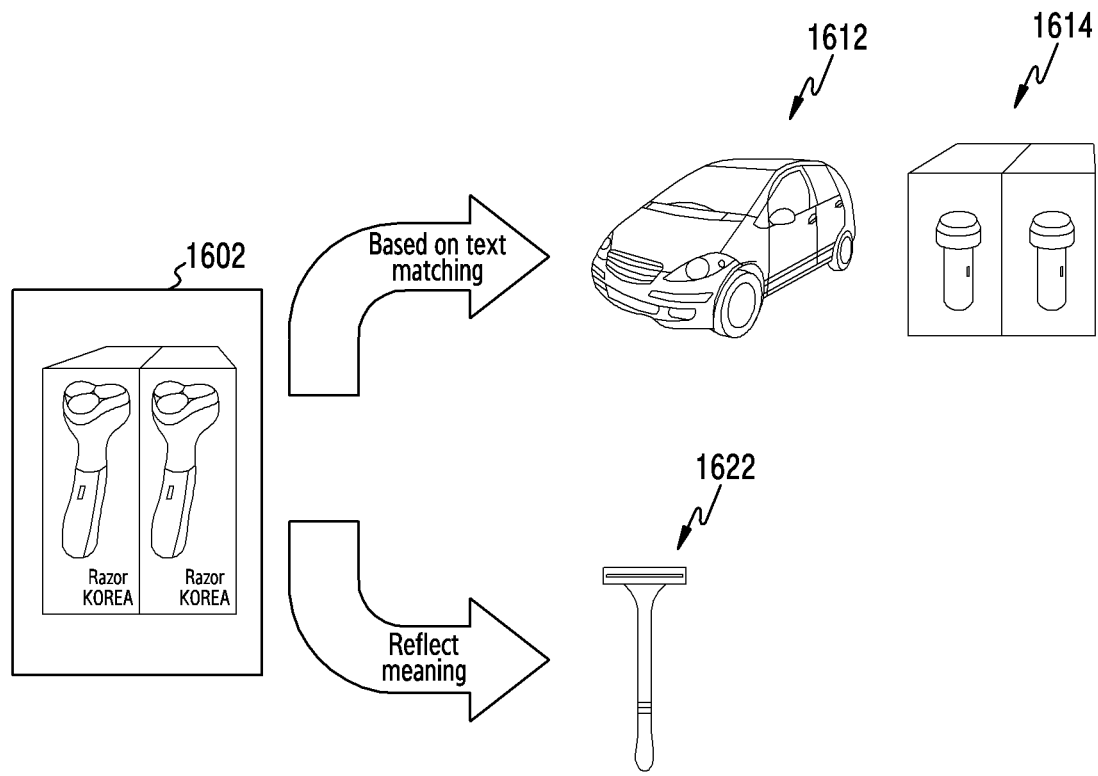

FIG. 14 to FIG. 16 are examples of a search result through a product search service according to various embodiments.

A query image 1402 of FIG. 14 is an image obtained by capturing a health supplement including a case on which a text 'selenium' indicating an ingredient is printed. When only an image-based similarity is used to search products, found products are a cleaning detergent 1412 and laundry detergent 1414 of which cases have similar appearances. According to various embodiments of the disclosure, the server 108 may recognize the meaning of text information of 'selenium', and may determine that the text information is a word similar to a nutritional supplement. Accordingly, the server 108 derives search results for products of a nutritional supplement type. As a result, when it is determined only with a similarity of an image, the cleaning detergent 1412 which is a high ranking item may be re-ordered as a lower item, and nutritional supplement products 1422 and 1424 of the same type may be re-ordered as high ranking items. Therefore, even if it is not an exact object which is searched for by a user, the user may identify the same type of products from high ranking items.

A query image 1520 of FIG. 15 is an image captured from a portable tissue paper on which a text 'Neo' indicating a trademark is printed. When products are searched based on text matching with respect to the query image 1520, a wallet 1512 and bags 1514 and 1516 which use the same 'Neo' as a trademark may be found. That is, when a word included in the query image 1502 is directly used for search, an incorrect result may be caused. Therefore, as in various embodiments of the disclosure, there is a need to recognize the meaning of a word and compare it with type information of images to be searched.

A query image 1530 of FIG. 16 is an image captured from an electric razor including a packaging box on which a text 'KOREA' indicating a manufacturing country and a text 'razor' indicating a product type are printed. When based on text matching or a similarity of an image, a product search result may present an automobile 612 with 'KOREA' as a manufacturing county, a flash 1614 with similar appearance of a packaging box and with 'KOREA' as a manufacturing country, or the like. However, if the meaning of the text 'razor' is recognized and a category of a product is reflected, a similar product, i.e., a manual razor 1622, may be presented as a search result. In other words, as shown in FIG. 16D, even if the similarity of the image is slightly inferior, the manual razor 1622 is found as a result of combining the meanings of the recognized words. As such, a search technology according to various embodiments of the disclosure can recognize a type of a product since a meaning of words is found by combining the words even if OCR words are misrecognized or comprehensive words are searched.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A server comprising:
a communication module;
a memory comprising a database which stores product information in association with one or more product images corresponding to a product and text information related to the product; and
a processor, wherein the processor is configured to:
receive a query image for an external object from an electronic device by using the communication module;
select, from the database, a plurality of pieces of product information corresponding to the external object, based on similarities between the one or more product images and the query image;
extract the text information for the external object comprised in the query image;
determine a priority among the plurality of pieces of product information, based on a comparison between the extracted text information and the text information comprised in the selected plurality of pieces of product information; and
transmit, to the electronic device, at least some of the plurality of pieces of product information and information on the priority, in response to the reception, by using the communication module,
wherein the text information comprises a name of the object acquired through image recognition for the external object and/or at least one text acquired through text recognition for the query image,
wherein the processor determines the priority among the plurality of pieces of product information, according to a comparison result between a first vector generated from the extracted text information for the external object comprised in the query image and a second vector generated from the text information comprised in the plurality of pieces of product information,
wherein the text information comprises a plurality of words,
wherein the first vector comprises a plurality of sub-vectors,
wherein the plurality of pieces of product information comprise first product information and second product information,
wherein the comparison result between the first vector and the second vector comprises a similarity to the first product information and a similarity to the second product information,
wherein the similarity to the first product information comprises an average value of comparison values between the plurality of sub-vectors and sub-vectors generated from text information comprised in the first product information, and
wherein each of the comparison values is determined based on an angle difference value between one of the plurality of sub-vectors generated from the query image and one of the sub-vectors generated from the text information for a first product.

2. The server of claim 1,
wherein the first vector is generated to have a high similarity to a vector generated from different text information comprising a text similar or identical to a dictionary meaning of a word comprised in the text information and related information for the external object derived from the text information, and
wherein the related information for the external object comprises at least one of an ingredient, a material, a producing area, and a category.

3. The server of claim 1, wherein the processor collects a product image for a plurality of candidate products and text information related to the candidate products from an external database.

4. A method of operating a server, the method comprising:
receiving a query image for an external object from an electronic device;
selecting a plurality of pieces of product information corresponding to the external object, based on similarities between the one or more product images and the image, from among product information comprising the one or more product images corresponding to a product and text information related to the product;
determining a priority among the plurality of pieces of product information, according to a comparison result between a first vector generated from text information for the external object comprised in the query image and a second vector generated from text information comprised in the plurality of pieces of product information; and transmitting, to the electronic device, information on a search result comprising at least some of the plurality of pieces of product information and information on the priority, wherein the text information comprises a plurality of words, wherein the first vector comprises a plurality of sub-vectors, wherein the plurality of pieces of product information comprise first product information and second product information, wherein the comparison result between the first vector and the second vector comprises a similarity to the first product information and a similarity to the second product information, wherein the similarity to the first product information comprises an average value of comparison values between the plurality of sub-vectors and sub-vectors generated from text information comprised in the first product information, and wherein each of the comparison values is determined based on an angle difference value between one of the plurality of sub-vectors generated from the query image and one of the sub-vectors generated from the text information comprised in the first product information.

5. The method of claim 4, wherein the text information comprises a name of the object acquired through image recognition for the external object and/or at least one text acquired through text recognition for the query image, wherein the first vector is generated to have a high similarity to a vector generated from different text information including a word similar or identical to a dictionary meaning of a word comprised in the text information and related information for the external object derived from the text information, and wherein the related information for the external object comprises at least one of an ingredient, a material, a producing area, and a category.

6. The method of claim 4, wherein the first vector is generated by using a learning model based on one of a Neural Network Language Model (NNLM), a Recurrent Neural Network Language Model (RNNLM), a Continuous Bag-Of-Words (CBOW), and a skip-gram.

7. An electronic device comprising:
a communication module;
a display;
a memory; and
a processor, wherein the processor is configured to:
acquire a query image for an external object;
transmit the query image to a server by using the communication module;
receive information on a search result comprising information on a priority between at least some of a plurality of pieces of product information selected based on similarities between one or more product images and the query image from among product information comprising the one or more product images corresponding to a product and text information related to the product and at least one of the plurality of pieces of product information; and
display at least one piece of product information among the plurality of product information comprised in the search result on the display, wherein the priority is determined based on a comparison between text information for the external object comprised in the query image and text information comprised in the plurality of pieces of product information, wherein the communication module receives the priority among the plurality of pieces of product information, according to a comparison result between a first vector generated from extracted text information for the external object comprised in the query image and a second vector generated from the text information comprised in the plurality of pieces of product information, wherein the text information comprises a plurality of words, wherein the first vector comprises a plurality of sub-vectors, wherein the plurality of pieces of product information comprise first product information and second product information, wherein the comparison result between the first vector and the second vector comprises a similarity to the first product information and a similarity to the second product information, wherein the similarity to the first product information comprises an average value of comparison values between the plurality of sub-vectors and sub-vectors generated from text information comprised in the first product information, and wherein each of the comparison values is determined based on an angle difference value between one of the plurality of sub-vectors generated from the query image and one of the sub-vectors generated from the text information for a first product.

8. The electronic device of claim 7, wherein the processor acquires the query image by performing shooting using a shooting device provided in the electronic device, by capturing an image displayed on the display, or by reading a file stored in the memory.

9. The electronic device of claim 7, wherein the processor displays, on the display, a screen in which the query image is disposed at an upper end and at least some of the plurality of pieces of product information are disposed at a lower end according to an order based on the priority, and wherein the screen further comprises at least one of additional information comprising a link capable of additionally searching products related to a key word related to one of the plurality of pieces of product information or additional information indicating common features of the plurality of pieces of product information.

10. The electronic device of claim 7, wherein the processor identifies the priority, based on orders of address values corresponding to at least some of the plurality of pieces of product information comprised in information on the search result.

11. The electronic device of claim 7, wherein the processor executes a camera application for acquiring the query image and displays, on the display, a screen comprising a guidance phrase for disposing the external object.

* * * * *